(12) United States Patent
Chern

(10) Patent No.: US 8,484,708 B2
(45) Date of Patent: Jul. 9, 2013

(54) DELEGATING AUTHENTICATION USING A CHALLENGE/RESPONSE PROTOCOL

(75) Inventor: Wei-Jhy Chern, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 12/636,609

(22) Filed: Dec. 11, 2009

(65) Prior Publication Data

US 2011/0145900 A1 Jun. 16, 2011

(51) Int. Cl.
*H04L 29/06* (2006.01)
(52) U.S. Cl.
USPC ............... 726/7; 726/5; 713/155; 713/168
(58) Field of Classification Search
None
See application file for complete search history.

(56) References Cited

U.S. PATENT DOCUMENTS

| | | | |
|---|---|---|---|
| 6,226,752 B1* | 5/2001 | Gupta et al. ................ 726/9 |
| 6,367,009 B1* | 4/2002 | Davis et al. ................ 713/166 |
| 6,983,377 B1 | 1/2006 | Beesley et al. |
| 7,322,040 B1 | 1/2008 | Olson et al. |
| 7,519,815 B2 | 4/2009 | Morris et al. |
| 7,606,915 B1* | 10/2009 | Calinov et al. ............. 709/229 |
| 7,801,827 B2* | 9/2010 | Bishop et al. .............. 705/67 |
| 7,877,492 B2* | 1/2011 | Chawla et al. ............. 709/229 |
| 7,953,671 B2* | 5/2011 | Bishop et al. .............. 705/67 |
| 8,005,965 B2* | 8/2011 | Williams ................... 709/228 |
| 8,037,514 B2* | 10/2011 | Kuffel et al. ............... 726/5 |
| 8,225,375 B2* | 7/2012 | Tsuchiya et al. ........... 726/3 |
| 8,347,374 B2* | 1/2013 | Schneider .................. 726/12 |
| 2001/0037469 A1* | 11/2001 | Gupta et al. ............... 713/202 |
| 2001/0044896 A1* | 11/2001 | Schwartz et al. .......... 713/169 |
| 2004/0230800 A1* | 11/2004 | Futa et al. ................. 713/169 |
| 2005/0021982 A1* | 1/2005 | Popp et al. ................ 713/184 |
| 2005/0113069 A1* | 5/2005 | Knauerhase et al. ...... 455/411 |
| 2006/0212701 A1* | 9/2006 | Warwick ................... 713/168 |
| 2009/0013381 A1* | 1/2009 | Torvinen et al. ........... 726/3 |
| 2010/0138658 A1* | 6/2010 | Logue et al. .............. 713/170 |
| 2010/0332336 A9* | 12/2010 | Quigley et al. ............ 705/18 |

OTHER PUBLICATIONS

Robbins, Daniel. "OpenSSH key management, Part 3." Gentoo Linux—Gentoo Linux News. Gentoo Linux, Oct. 21, 2005. Web. Feb. 16, 2010. <http://www.gentoo.org/doc/en/articles/openssh-key-management-p3.xml?style=printable>.
Todorov, Dobromir. Mechanics of User Identification and Authentication Fundamentals of Identity Management. Boca Raton: AUERBACH, 2007. p. 678.

* cited by examiner

*Primary Examiner* — Nathan Flynn
*Assistant Examiner* — Michael R Vaughan
(74) *Attorney, Agent, or Firm* — Canon USA Inc. IP Division

(57) ABSTRACT

A method for delegating authentication using a challenge/response protocol is provided. The method may initiate with a challenge/response sequence between a client application and a server application to authenticate the client application. Then the server application authenticates to a second server application using the credentials associated with the client application by acting as a conduit between the client application and the second server application.

13 Claims, 5 Drawing Sheets

DELEGATING AUTHENTICATION USING A CHALLENGE/RESPONSE PROTOCOL

BACKGROUND OF THE INVENTION

1. Field of the Invention

The present invention relates to a method for authenticating a client to a plurality of servers by delegation using a challenge/response protocol.

2. Description of the Related Art

Authentication is a method that allows a web browser, or other client application, to provide credentials to a server application. The credentials may be in the form of a user name and password when making a request. If the correct credentials are provided to the server application, access to the server application is permitted. The client application may seek access to the server application for a particular service or product. Such authentication is common in the context of an HTTP transaction.

Although the implementation of an authentication scheme between the client application and the server application seems relatively simple, there are scenarios where authentication between the client application and the server application is not sufficient for particular types of services. For example, after the client application is authenticated to the server application, it maybe necessary to authenticate the client application to a second server application. One solution is to require the client application to contact the second server application and directly authenticate itself to the second server application. However, this assumes that the client application is aware of the second server application and is familiar with the location of the second server application. However, it is common for the client application to be unaware of the second server application after authenticating to the server application. This presents an issue with respect to authenticating the client application to the second server application subsequent to the authentication of the client application to the server application.

Another solution may include the server application authenticating itself to the second server application using the credentials associated with the server application rather than credentials associated with the client application. However, this method may present a few issues with respect to redundancy and the difficulty in enforcing such a method.

Referring to FIG. 4 a challenge/response sequence is shown according to the prior art. The challenge/response protocol is used to authenticate the client application in various systems. For example, NTLM is a Microsoft authentication protocol used with the SMB protocol. The protocol uses a challenge/response sequence requiring the transmission of three messages between the client application and the server application. The client application first sends a challenge/response request as provided in step S100. The challenge/response request may contain a set of flags of features supported or requested to the server application. The features may include encryption key sizes, request for mutual authentication, etc. The server application then responds with a challenge as noted in step S102. The challenge contains a similar set of flags supported or required by the server application enabling an agreement on the authentication parameters between the server application and the client application. The client application uses the challenge obtained in step S102 and a user's credentials associated with the client application to calculate a response.

By way of example, one method that may be used to calculate the response includes MD4/ MD5 hashing algorithms and DES encryption. However, other methods are contemplated. The client application then transmits the response as shown in step S104. The above three steps constitute the challenge/response sequence. Additionally, the server application may validate the response and return the result to the client application as shown in step S106.

The client application may be a personal computer, handheld device, or any other similar device that may be associated with a user or the user's credentials. The client application may also include a browser used to communicate with the server application via the Internet or a network. The client application seeks access to the server application. The server application on the other hand, will request authentication so that the client application may properly gain access to the server application. The server application may be a server computer, a personal computer, or similar device.

Referring now to FIG. 5, the challenge/response sequence includes an authentication server. The authentication server is a server that provides authentication services to users or other systems via networking. Remotely placed client applications and other server applications authenticate to the authentication server. Some authentication algorithms that may be used with authentication servers are passwords, Kerberos, and public key encryption by way of example and not of limitation.

Similar to the challenge/response sequence provided in FIG. 4, the client application transmits a challenge/response request to the server application in step S100. However, the server application forwards the challenge/response request to the authentication server in step S101. This step may be necessary where the server application does not include or store credentials used for authenticating the client application. The authentication server generates the challenge and transmits the challenge to the server application in step S103, then the server application forwards the challenge to the client application according to step S102. The client application generates and transmits a response to the server application in step S104. The server application forwards the response to the authentication server for validation in step S105. The validation result is transmitted to the server application in step S107 and forwarded from the server application to the client application instep S106. Now the client application may access the server application.

While the above method may be useful for authentication between the client application and the server application, there are some disadvantages. If the server application needs to contact a second server application, it may not be able to do so if the second server application requires authentication. The first server application may not be able to authenticate to the second server application because it lacks the credentials associated with the client application. Thus, authentication by the first server application to the second server application may not be possible using the same protocol. Instead, the first server application must use a different protocol. Alternatively, the first server application may use fixed credentials such as a username and password and always use those credentials to authenticate to the second server application, without having to use the credentials of the client application. However, this may be cumbersome, as the first server application will be functioning under the client application while the second server application will be functioning under the first server application or a different user.

A method for authenticating a client application to a server application and a second server application may be accomplished by delegation. Delegating authentication allows the server application to act as a conduit between the client application and the second server application. Alternatively, the server application may act as a conduit between the client application and a plurality of server applications. After the client application authenticates itself directly to the server application, the server application may authenticate itself to the second server application on behalf of the client application. This is accomplished using the credentials associated with the client application.

However, delegating the authentication between the client application and the second server application requires a trusted third party. A trusted third party is an entity that facilitates interactions between two parties who both trust the third party. The third party reviews all critical transaction communications between parties. A trusted third party is common in commercial transactions and in cryptographic digital transactions. Transactions that require a trusted third party may also require a third party repository service adding to the complexity of the delegation process.

Authenticating a client application to a server application using a challenge/response protocol does not require a trusted third party. In computer security, challenge/response authentication is a protocol in which one party presents a question ("challenge") and another party must provide a valid answer ("response") for authentication. One example of a challenge/response protocol is password authentication, where the challenge is asking for the password and the valid response uses the correct password to calculate the appropriate response. However, the challenge/response protocol is used for single level authentication between a client application and a server application. In the case where the client application needs to be authenticated to a server application and a second server application, challenge/response protocol has not been utilized.

Accordingly, a method for delegating authentication of a client application to multiple server applications using a challenge/response protocol that does not require a trusted third party is advantageous.

SUMMARY OF THE INVENTION

According to an aspect of the present invention, a method performed by a server application for delegating authentication of a client application using a challenge/response protocol is provided. The method may begin with a server application determining that authentication of a client application is required and transmitting an authentication request to the client application. The server application is configured to receive a challenge/response request from the client application. The method includes authenticating the client application to the server application in accordance with the challenge/response protocol. The server application transmits an access request to a second server. The server application receives an authentication request from the second server application and transmits the authentication request to the client application. The method may continue with the server application receiving a second challenge/response request from the client application and transmitting the second challenge/response request to the second server application. The method may conclude with authenticating the server application to the second server application based on the second challenge/response request on behalf of the client application in accordance with the challenge/response protocol.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The present invention uses challenge/response protocol to delegate authentication of a client application to a second server application or a plurality of server applications. A first server application authenticates to the second server application on behalf of the original client application. When the first server application needs to authenticate to the second server application, the first server application asks the client application, which has the password, to generate a challenge/response request, and produce the response. Therefore, the first server application may act as a conduit between the client application and the second server application.

The first server application and the client application work together to act as the client application for the purpose of authenticating to the second server application and perform a challenge/response sequence for authentication purposes. Therefore, the first server application is authenticated to the second server application as if the first server application has a user's original credentials associated with the client application.

This method provides for delegation capabilities based on the challenge/response protocol. One advantage to using the challenge/response protocol is the ability to plug the challenge/response sequence into an existing HTTP protocol with NTLM authentication between web browsers and multiple web servers by way of example and not of limitation. This allows for leveraging existing protocols without requiring special or custom software to be installed on the client application.

Figure 1:
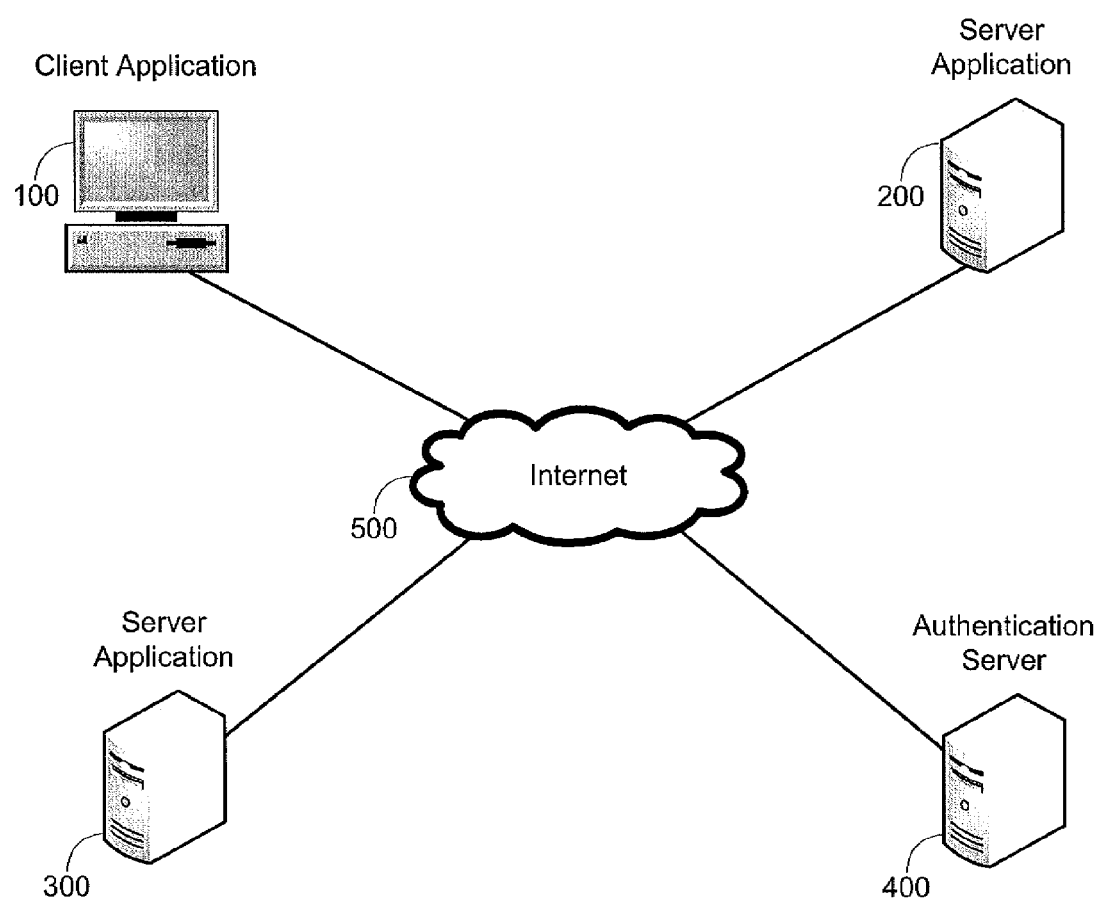
FIG. 1 is a diagram showing an arrangement of a system for delegating authentication including a server application as a conduit between a client application and a second server application according to an embodiment of the present invention.

Referring now to FIG. 1, the diagram includes a client application 100, a server application 200, a second server application 300, and an authentication server 400. The client application 100 and the servers 200, 300, 400 may communicate with each other via a network or the Internet 500 as shown. In another embodiment, the authentication server 400 may not be a stand-alone device, rather the authentication server 400 may be incorporated into the server application 200.

Figure 6:
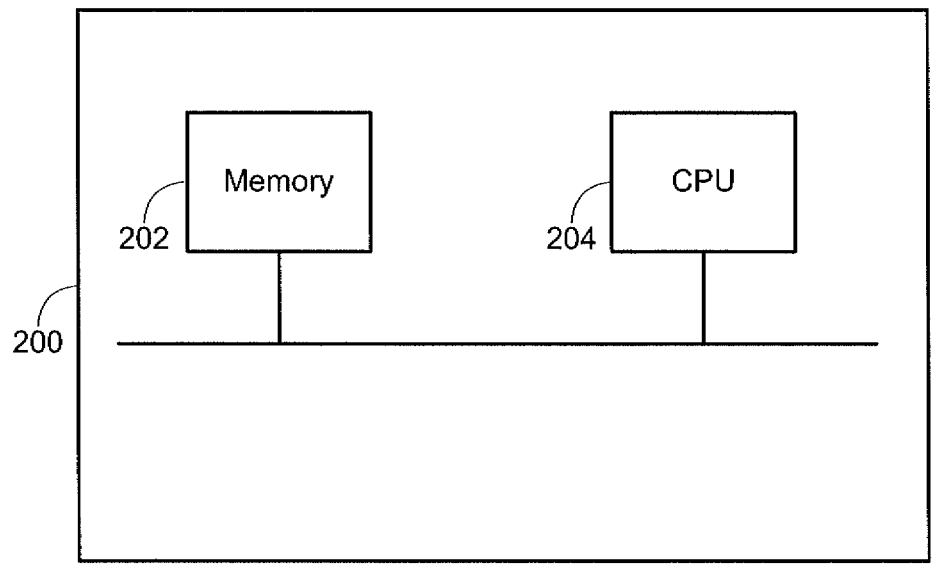
FIG. 6 illustrates a block diagram of a delegation apparatus including various components according to an embodiment of the present invention.

FIG. 6 is a block diagram of the server application 200 including some of the components that may comprise the server application 200. The components include a memory 202 and a processor 204. It will be appreciated that the server application 200 may include various other components not illustrated in FIG. 6, for example, input port(s), output port(s), a network interface card, a display device, etc. Although the memory 202 and the processor are shown as components of the server application 200, a memory and a processor may also be included in the client application 100, the second server application 300, and the authentication server 400.

Figure 2:
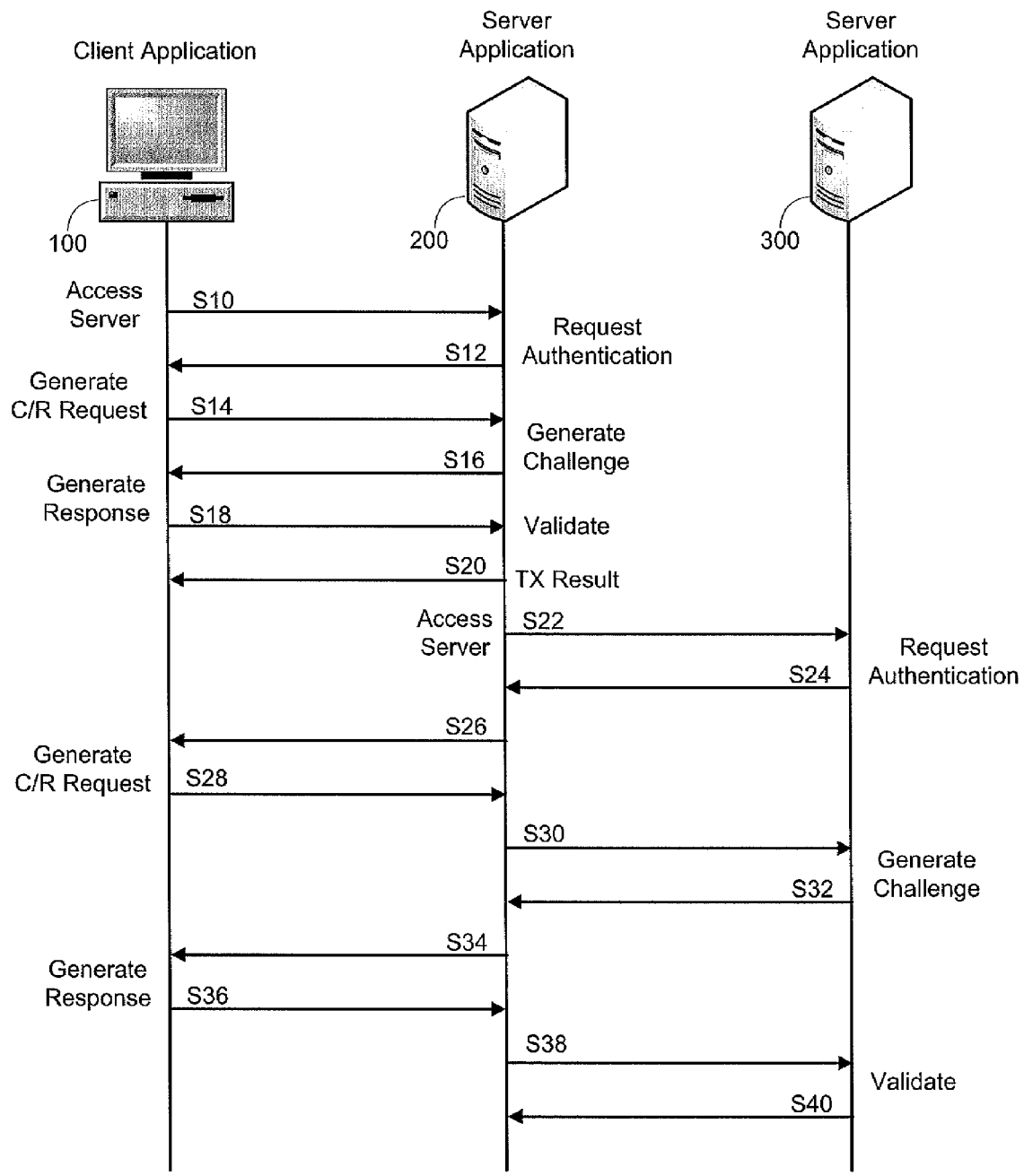
FIG. 2 illustrates a sequencing chart for delegating authentication of the client application according to an embodiment of the present invention.

Referring now to FIG. 2, a sequence chart is provided with the steps necessary to delegate authentication of the client application 100 using the challenge/response protocol. In this embodiment, the authentication credentials may be stored within the server application 200. The client application 100 may initiate a challenge/response sequence by attempting to access the server application 200 in step S10. Then, the server application 200 may request the client application 100 to authenticate itself according to step S12. After receiving the authentication request, the client application 100 generates a challenge/response request and transmits the request to the server application 200 in step S14. The server application 200 generates a challenge in step S16 to transmit back to the client application 100. The client application 100 generates a response to the challenge and transmits the response to the server application 200 in step S18. Upon receiving the response, the server application 200 validates the response and transmits the result in step S20 to the client application 100. At this time the client application 100 is authenticated to the server application 200.

Following the authentication of the client application 100 to the server application 200, the client application may need to be authenticated to a second server application 300. The method continues with the server application 200 attempting to access the second server application 300 on behalf of the client application 100 in step S22. In step S24 the second server application 300 requests the server application 200 to authenticate in order to gain access. Because the server application 200 is authenticating itself on behalf of the client application 100, the server application 200 forwards the authentication request that originated from the second server application 300 in step S26. In this respect, the server application 200 may act as a conduit between the client application 100 and the second server application 300 using the challenge/response protocol.

The client application 100 generates and then transmits another challenge/response request to the server application 200 in step S28. The server application 200 then forwards the challenge/response request to the second server application 300 in step S30. Upon receiving the challenge/response request, the second server application 300 generates a challenge to transmit to the server application 200 in step S32. The server application 200 then forwards the challenge to the client application 100 in step S34. The client application 100 then produces a response to the challenge to be transmitted to the server application 200 in step S36. The server application 200 forwards the response to the second server application 300 in step S38 for validation. Once the second server application 300 validates the response and returns the result to the server application 200 in step S40, the client application 100 is authenticated to the second server application 300 without requiring any input from a user of the client application. As a result, the server application 200 authenticates on behalf of the client application 100.

Figure 3:
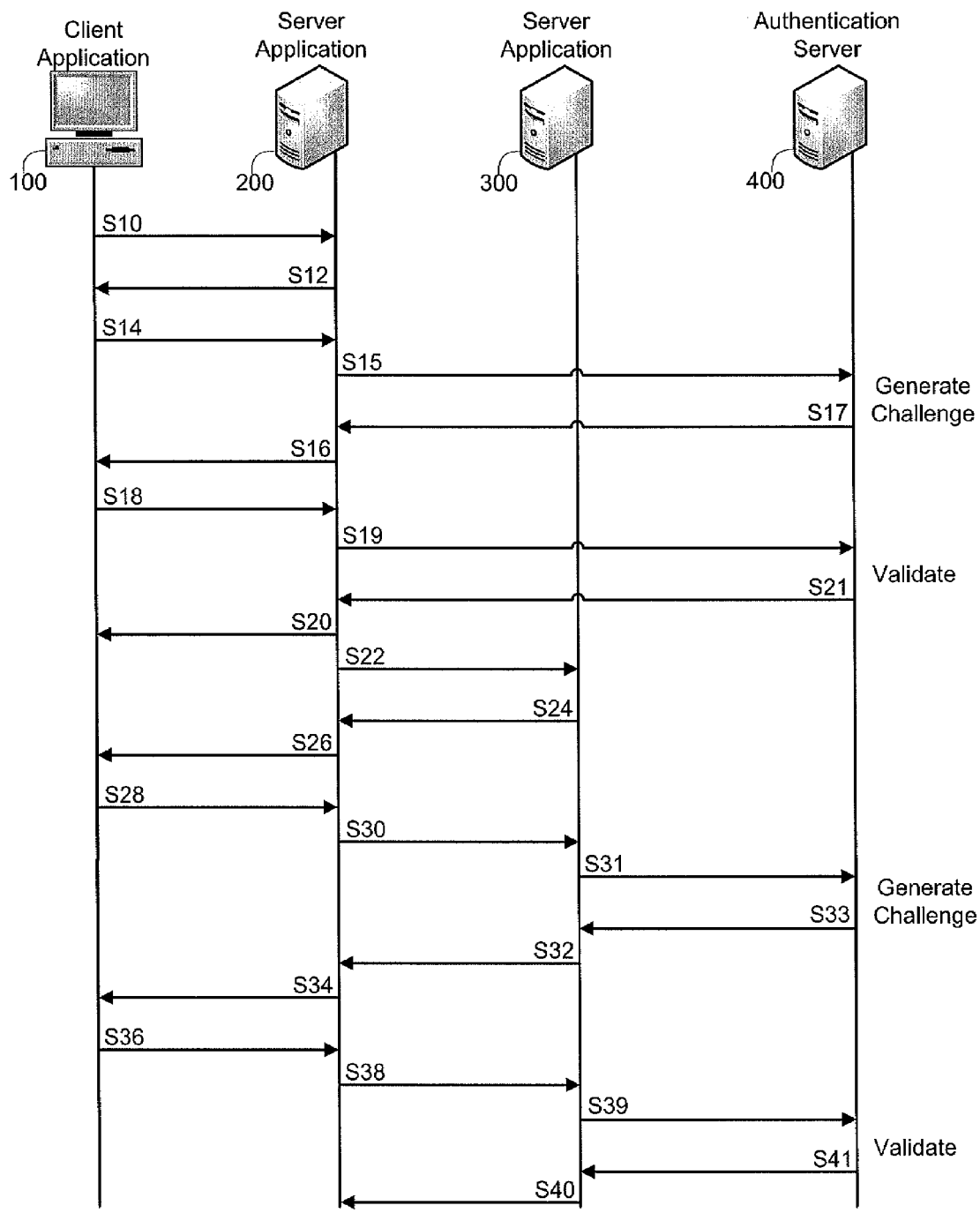
FIG. 3 illustrates a sequencing chart for delegating authentication of the client application according to another embodiment of the present invention.
Figure 4:
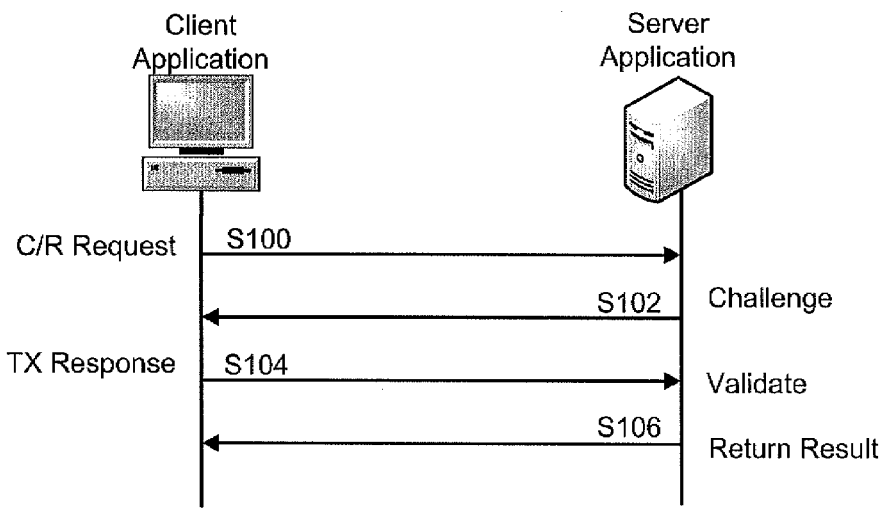
FIG. 4 illustrates a sequence chart for authenticating the client application to the server application according to prior art.
Figure 5:
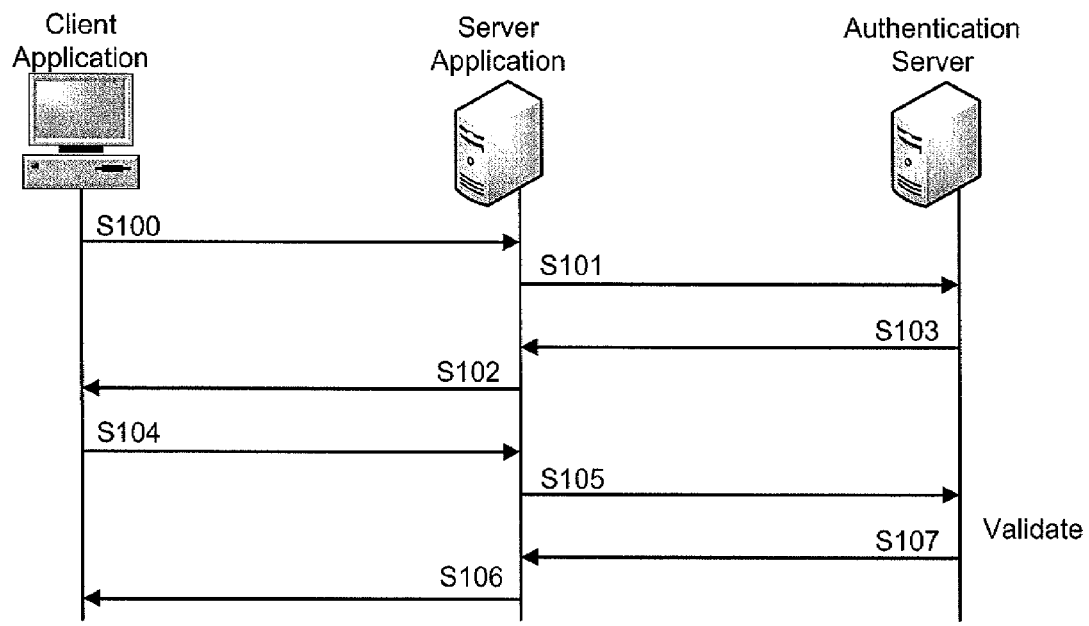
FIG. 5 illustrates a sequence chart for authenticating the client application to the server application according with an authentication server according to prior art.

Referring now to FIG. 3, an authentication server 400 is provided in addition to the client application 100, the server application 200 and the second server application 300. In this embodiment, the authentication server 400 is used to communicate with the server application 200 and the second server application 300 to assist in authenticating the client application 100 using the challenge/response protocol. The authentication server 400 may be used to store both client credentials, the server application credentials, and the second server application credentials. The credentials may include by way of example and not of limitation, username, password, public key, private key, etc.

The authentication server 400 receives the challenge/response request generated by the client application 100 and forwarded by the server application 200 in step S15. The authentication server 400 generates a challenge in response to receiving the authentication request and transmits the challenge to the server application 200 in step S17. Subsequently, the authentication server 400 receives a response to the challenge in step S19 that is forwarded by the server application 200. The authentication server 400 uses the client credentials stored within the authentication server's database, to validate the response generated by the client application 100 and provided by the server application 200. The authentication server 400 in step S21 returns the validation results to the server application 200. Thus, the authentication server 400 communicates with the server application 200 to assist in the authentication using challenge/response protocol between the client application 100 and the server application 200.

Still referring to FIG. 3, the authentication server 400 assists in the authentication of the client application 100 to the second server application 300 via the server application 200. After the authentication of the client application 100 to the server application 200, the authentication server 400 receives a challenge/response request in step S31 from the second server application 300. The authentication server 400 then generates a challenge to be transmitted to the client application 100 in step S33. The client application produces a response to the challenge which is transmitted to the authentication server 400 from the second server application 300 in step S39. Then, the authentication server 400 combines the response and the credentials stored therein to validate the response generated by the client application 100. Subsequent to validation, the results are returned to the second server application 300 in step S41. Thus, the authentication server 400 communicates with the second server application 300 so that the server application 200 can access the second server application 300 on behalf of the client application 100.

Figure 7:
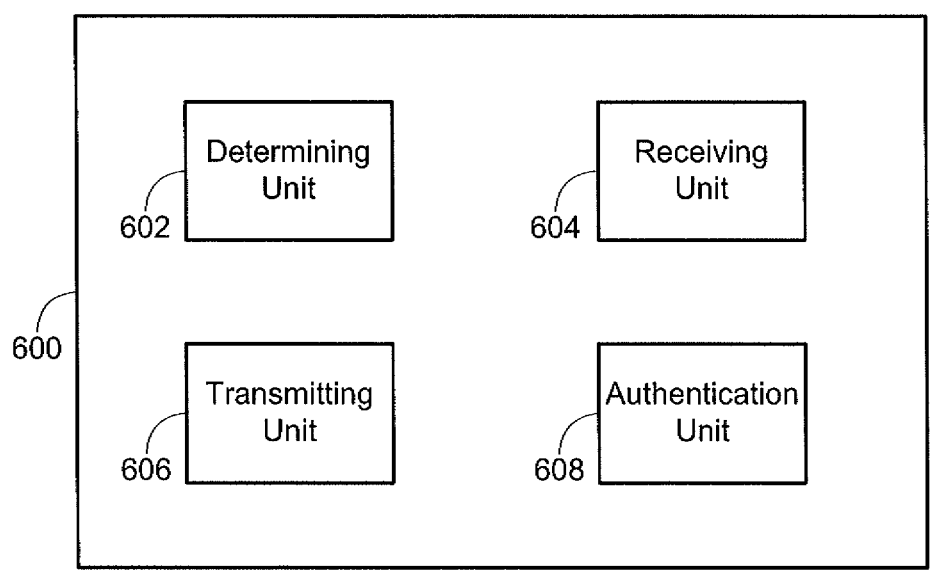
FIG. 7 illustrates a block diagram of the server application including a processor and a memory.

In another embodiment of the present invention, a delegation apparatus for delegating authentication of a client application is shown in FIG. 7. Referring to FIG. 7, the delegation apparatus 600 includes a determining unit 602, a receiving unit 604, a transmitting unit 606 and an authentication unit 608. The determining unit 602 determines whether the client application 100 should be authenticated to the server application 200 or the second server application 300. The receiving unit 604 is configured to receive a first challenge/response request and a second challenge/response request during authentication of the client application 100. The transmitting unit 606 is configured to transmit an access request to the second server application 300. The authentication unit 608 is used to authenticate the client application 100 to the server application 200 and the second server application 300 if necessary. The authentication unit 608 may be stored within the delegation apparatus 600. However, it is contemplated that the authentication unit 608 may be stored separate from the delegation apparatus 600 and connected to the delegation apparatus 600 through a network or the Internet.

The processing in the above exemplary embodiment may be provided to a system or an apparatus with a recording medium on which software for realizing the functions of the exemplary embodiment is recorded. The functions of the above exemplary embodiment may be realized by having a computer (or a CPU or a micro processing unit (MPU)) of the system or apparatus read and execute the instructions stored in the recording medium.

In this case, the computer-executable instructions read from the recording medium realize the functions of the above exemplary embodiment. Examples of recording media which can be used for supplying such computer-executable instructions include a floppy disk, a hard disk, an optical disk, a magneto-optical disk, a compact disc read only memory (CD-ROM), a compact disc recordable (CD-R), a magnetic tape, a nonvolatile memory card, a ROM and the like.

Further an operating system (OS) or the like running on the computer may perform a part or all of the actual processing, and by that processing the functions of the above-described exemplary embodiment can be realized.

Further, the present invention also includes cases where the computer-executable instructions read from the recording medium are written into a memory provided on a function expansion board inserted into the computer or a function expansion unit connected to the computer. A CPU or the like provided on the function expansion board or function expansion unit may perform a part or all of the actual processing, and by that processing the functions of the above exemplary embodiment can be realized.

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

What is claimed is:

1. A method performed by a server application for delegating authentication of a client application using a challenge/response protocol, the method comprising:
   determining that authentication of a client application is required and transmitting an authentication request to the client application;
   receiving a challenge/response request from the client application;
   authenticating the client application to the server application in accordance with the challenge response protocol;
   transmitting an access request to a second server application;
   receiving an authentication request from the second server application and transmitting the authentication request to the client application;
   receiving a second challenge/response request from the client application and transmitting the second challenge/response request to the second server application; and
   authenticating the server application to the second server application based on the second challenge/response request on behalf of the client application in accordance with the challenge/response protocol,
   wherein an authentication server is in communication with the server application and configured to authenticate the client application in accordance with the challenge/response protocol.

2. The method according to claim 1, wherein the server application determines that authentication is required when the client application attempts to access the server application.

3. The method according to claim 1, wherein authenticating the client application to the server application in accordance with the challenge/response protocol comprises:
   transmitting a challenge to the client application;
   receiving a response to the challenge from the client application; and
   validating the response and returning a result of the validation to the client application.

4. The method according to claim 3, wherein the challenge is random data and the response is derived from the challenge and a password.

5. The method according to claim 1, wherein authenticating of the server application to the second server application on behalf of the client application in accordance with the challenge/response protocol comprises:
   receiving a second challenge from the second server application and transmitting the second challenge to the client application;
   receiving a response to the second challenge from the client application and transmitting the response to the second challenge to the second server application; and
   receiving a validation from the second server application.

6. The method according to claim 1, wherein the server application transmits the challenge/response request to the authentication server and the authentication server generates a challenge and transmits the challenge to the server application.

7. The method according to claim 6, wherein the server application transmits a response to the authentication server so that the authentication server can validate the response.

8. The method according to claim 1, wherein the authentication server includes a storage unit for storing a plurality of security credentials.

9. A method for authenticating a client application to a first server application and a second server application by delegation using a challenge/response protocol, the method comprising:
   establishing a data transfer link between the client application and the first server application;
   requesting the client application to authenticate to the first server application;
   authenticating the client application using a challenge/response sequence between the client application and the first server application;
   establishing a data transfer link between the first server application and the second server application;
   requesting the first server application to authenticate to the second server application;
   transmitting the request to authenticate from the first server application to the client application; and
   authenticating the first server to the second server on behalf of the client application using a second challenge/response sequence between the client application and the first server application,
   wherein the first server application communicates with the second server application and the second server application communicates with an authentication server.

10. The method according to claim 9, wherein authenticating the client application to the first server application using the challenge/response sequence comprises:
    generating a challenge/response request and transmitting the challenge/response request from the client application to the first server application;

receiving the challenge/response request and transmitting the challenge/response request from the first server application to the authentication server;

generating a challenge and transmitting the challenge from the authentication server to the first server application which relays the challenge to the client application; and generating a response at the client application, transmitting the response to the first server application to relay to the authentication server for validating the response to the challenge.

11. The method according to claim 9, wherein authenticating the first server to the second server on behalf of the client application using the second challenge/response sequence comprises:

generating a second challenge/response request and transmitting the second challenge/response request to the first server application, forwarding the second challenge/response request to the authentication server;

generating a challenge and transmitting the challenge to the second server application and then forwarding to the client application through the first server application; and generating a response to the challenge, transmitting the response to the first server application to forward to the authentication server through the second server for validating the response.

12. A delegation apparatus for delegating authentication of a client application using a challenge/response protocol with a server application, the delegation apparatus comprising:

a determinating unit configured to determine if the client application is to be authenticated to the server application or a second server application;

a receiving unit configured to receive a first challenge/response request and a second challenge/response request from the client application;

a transmitting unit configured to transmit an access request from the server application to the second server application; and an authentication unit configured to authenticate the client application to the server application in response to the first challenge/response request in accordance with the challenge/response protocol, wherein the authentication unit authenticates the server application to the second server application on behalf of the client application in response to the server application receiving the second challenge/response request from the client application, wherein an authentication server is in communication with the server application and configured to authenticate the client application in accordance with the challenge/response protocol.

13. A non-transitory computer-readable storage medium which stores computer-executable instructions for causing a computer to execute a method for delegating authentication of a client application using a challenge/response protocol with a server application, the method comprising:

determining that authentication of a client application is required and transmitting an authentication request to the client application;

receiving a challenge/response request from the client application;

authenticating the client application to the server application in accordance with the challenge/response protocol;

transmitting an access request to a second server application;

receiving an authentication request from the second server application and transmitting the authentication request to the client application;

receiving a second challenge/response request from the client application and transmitting the second challenge/response request to the second server application; and authenticating the server application to the second server application based on the second challenge/response request on behalf of the client application in accordance with the challenge/response protocol, wherein an authentication server is in communication with the server application and configured to authenticate the client application in accordance with the challenge/response protocol.

* * * * *